E. EISEMANN.

WASHING MACHINE.

APPLICATION FILED NOV. 30, 1908.

Reissued June 15, 1909.

12,976.

3 SHEETS—SHEET 1.

WITNESSES

F. H. Ulman

James F. Duhamel

INVENTOR

Emil Eisemann

BY

Thos. H. Bowering

ATTORNEY

THE NORRIS PETERS CO., WASHINGTON, D. C.

E. EISEMANN.

WASHING MACHINE.

APPLICATION FILED NOV. 30, 1908.

Reissued June 15, 1909.

12,976.

3 SHEETS—SHEET 2.

WITNESSES

F. H. Ulman

James F. Dehamel

INVENTOR

Ernie Eisemann

BY

Thos. H. Browning

ATTORNEY

THE NORRIS PETERS CO., WASHINGTON, D. C.

E. EISEMANN.
WASHING MACHINE.
APPLICATION FILED NOV. 30, 1908.
Reissued June 15, 1909.
12,976.
3 SHEETS—SHEET 3.
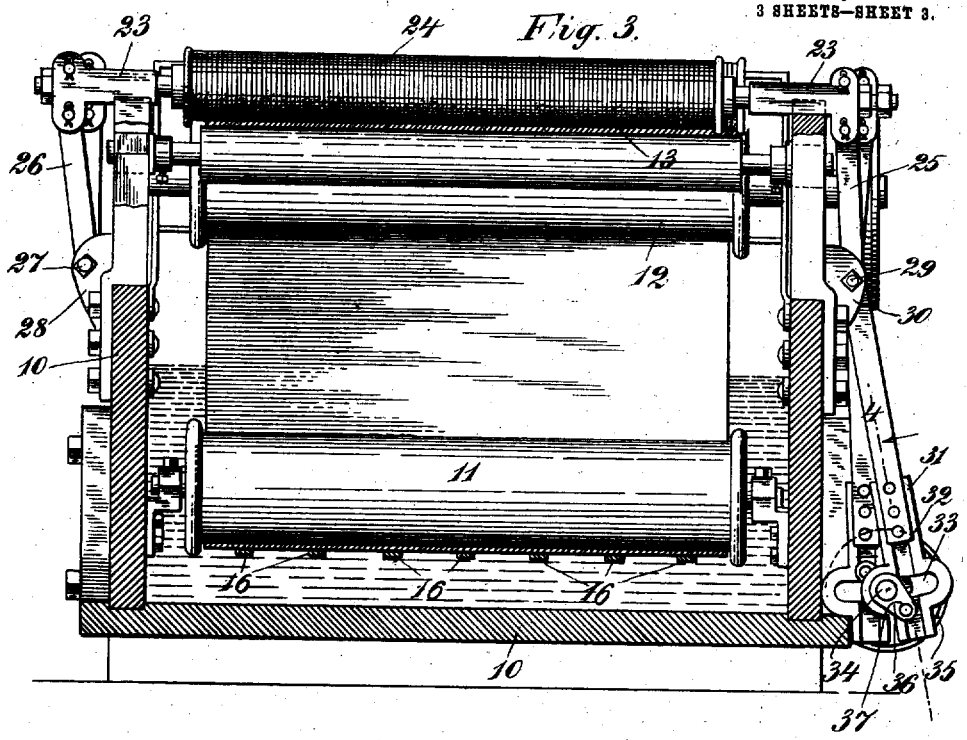
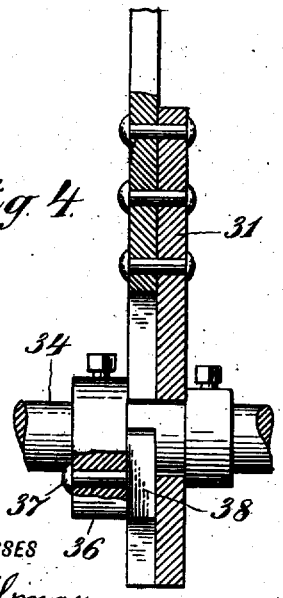
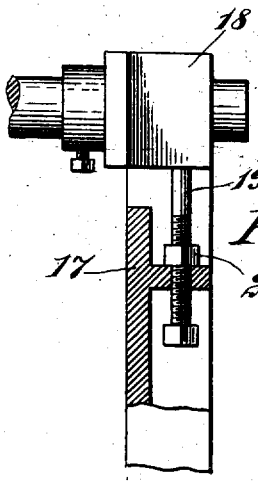
WITNESSES
F. H. Ulman
James F. Ashamel
INVENTOR
Emil Eisemann
BY
Geo. H. Bonnevey
ATTORNEY
THE NORRIS PETERS CO., WASHINGTON, D. C.

UNITED STATES PATENT OFFICE.

EMIL EISEMANN, OF NEW YORK, N. Y.

WASHING-MACHINE.

No. 12,976. Specification of Reissued Letters Patent. Reissued June 15, 1909.

Original No. 890,505, dated June 9, 1908, Serial No. 401,203. Application for reissue filed November 30, 1908. Serial No. 465,450.

*To all whom it may concern:*

Be it known that I, EMIL EISEMANN, a citizen of the United States, and a resident of New York, borough of Manhattan, in the county and State of New York, have invented certain new and useful Improvements in Washing-Machines, of which the following is a specification.

This invention relates to washing machines, with particular reference to machines for cleansing articles such as plumes and feathers. Such articles, when designed for ornamental purposes, must first have the natural grease or oils and other organic matter removed, and, if dyed, must be again washed to remove the surplus chemicals.

It has long been the common practice to wash these plumes and feathers on a washboard, in much the same manner as various articles of wearing apparel are washed by hand. Nothing has been found which will accomplish any better results than this old method, but this process is naturally slow and cannot under any circumstances insure uniform results.

The object of the present invention is the production of a machine, the effect of the operations of which approaches, as closely as possible, that of washing by hand, and which will not only save time but which will insure uniformity in results.

My invention will be more readily understood by reference to the accompanying drawings, forming a part of this specification, in which—

Figure 1:
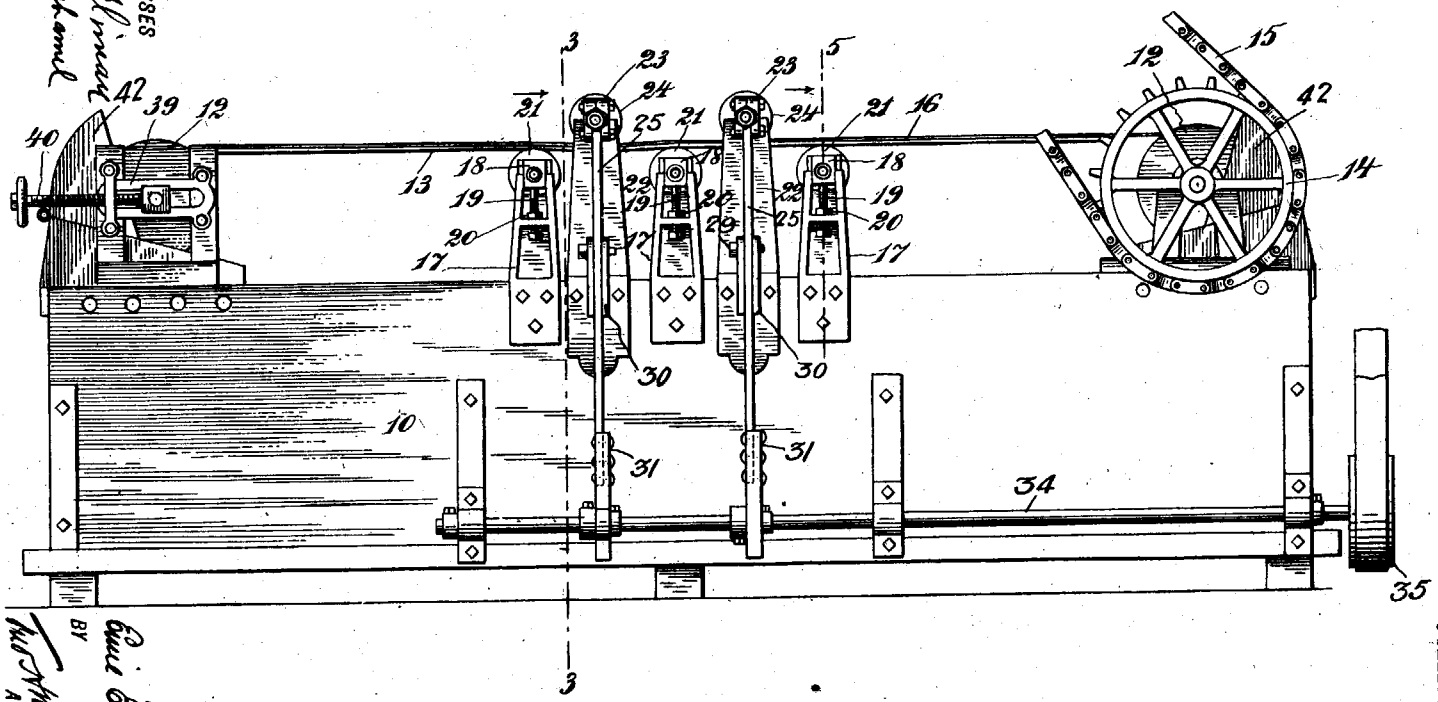
Figure 2:
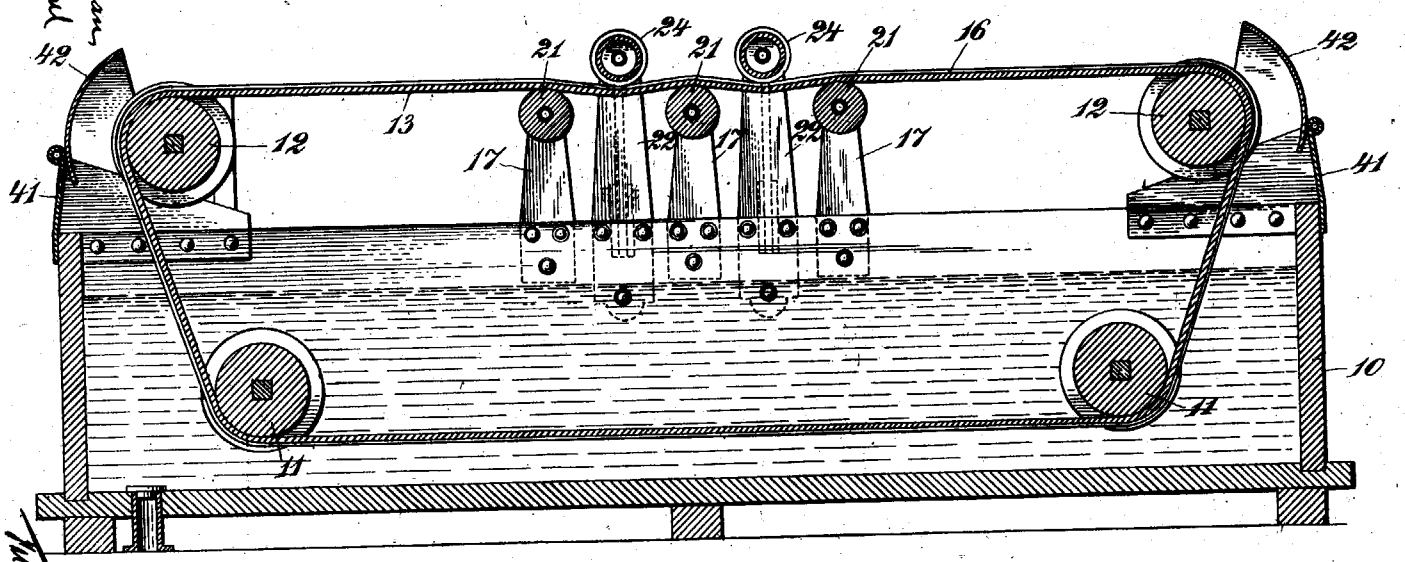

Figure 1 is a side elevation of a washing machine embodying my invention; Fig. 2 is a central vertical longitudinal section of the same; Fig. 3 is a cross-section taken substantially on the line 3—3 of Fig. 1; Fig. 4 is a section, on an enlarged scale, on the line 4—4 of Fig. 3, and Fig. 5, is a section on the line 5—5 of Fig. 1.

Referring now to the drawings in detail, numeral 10 refers to a suitable tank, preferably of substantially rectangular configuration and provided with the usual drain pipe and plug, as shown in Fig. 2.

Journaled in suitable bearings near opposite ends of the tank and adjacent to the bottom thereof, are the rolls 11 which extend substantially the full width of the tank. Similar rolls 12 are journaled in suitable bearings supported upon the tank and preferably located above the top thereof. These rolls 12 are positioned nearer to the respective ends of the tank than the rolls 11. These four rolls carry an endless belt 13, and in view of their relative location, direct the end portions of said belt outwardly in an upward direction and extend the bottom horizontal length thereof in the tank 10 below the water-line, whereby the articles to be washed, which are designed to be carried by the belt, will be compelled to travel substantially the full length of the tank under water when the belt is driven. The driving of the belt is preferably accomplished by a sprocket-wheel 14 attached to the axle of one of the rolls and driven by a chain 15 from any suitable source of power.

When my machine is used for the purpose of washing plumes or feathers, the manner of attaching or securing these articles to the belt is of great importance. I have found that the best results may be obtained by sewing or otherwise securing to the outer face of the belt at suitable intervals a series of longitudinally-arranged flexible strips 16, the securing means providing loops or spaces between said strips and said belt in which the feathers may be inserted in a transverse direction.

Intermediate the rolls 12, and preferably located substantially midway therebetween, are rigidly secured to the opposite sides of the tank a number of upright arms 17, three being shown in the drawings, said arms being provided with guide-ways in their upper ends in which bearing-blocks 18 are slidably mounted and adjustably supported by the adjusting screws 19, the latter being threaded through the cross-ribs of the arms and locked in place by the lock-nuts 20. In the bearing-blocks 18 are journaled rollers 21 contacting with the under face of the upper horizontal length of the endless belt 13. Similarly secured to the sides of the tank and located between each pair of the arms 17 are the arms 22, in the upper ends of which are the cross-wise slidable bearing-blocks 23, each set of bearing-blocks having journaled therein a roller 24 which contacts with the upper face of the upper horizontal lengths of said endless belt, and the contacting portion thereof, when the roller is properly adjusted, is located slightly below the plane tangential to the top of the rollers 21, as clearly shown in Fig. 2, whereby the belt will be slightly distorted, as shown, and the feathers carried thereby firmly pressed and squeezed as they are carried under and over these rollers. Each roller 24, as shown in Fig. 3, is spirally wrapped, preferably with a cotton or hemp rope, giving the roller a transversely corrugated rubbing perimeter.

The outer ends of the bearing-blocks 23 are pivotally connected at one side of the tank to operating levers 25, and at the opposite side of the tank to the upper ends of arms or links 26 which are pivoted at their lower ends on the bolts or pins 27 in the brackets 28 secured to the side of the tank. The operating levers 25 are correspondingly fulcrumed intermediate their ends on bolts or pins 29, in similar brackets 30 secured to the tank, at which point said levers have a slight outward bend. These levers 25 extend to points near the bottom of the tank where they are provided with the heads 31, each head being constructed with a longitudinal groove 32 and an arc-shaped slot 33 concentric to the pin 29. Through the slots 33 of the heads 31, passes a driving shaft 34, journaled in suitable bearings carried by the tank and having a driving pulley 35 or other power-transmitting device.

Secured to the shaft 34, adjacent to the heads 31, are the crank arms 36 which are substantially oppositely disposed and have the crank pins 37 (best shown in detail in Fig. 4) journaled therein and connected with bearing-blocks 38 slidable in the longitudinal grooves 32 in the heads 31. It will be apparent that this construction operates to axially slide the rollers 24 back and forth across the belt as they are being rotated thereby, thus subjecting the articles carried by the belt to a combined scrubbing and squeezing action, corresponding closely to the hand-washing operation, which frees said article of the undesirable foreign matter without injury.

Provision is made at one end of the tank for regulating the tension on the endless belt, by slidably mounting the bearings of one of the rolls 12 in substantially horizontally-disposed slotted guides 39, and connecting the bearings with adjusting screws 40, the latter being threaded through fixed butts or openings arranged at one end of the guide.

The elevation of the upper rolls 12 above the top of the tank makes the belt accessible for applying and removing the feathers or other articles, but also makes it possible for the water to be thrown from the feathers over the ends of the tank when the belt is in motion. To avoid this, the walls of the tank at the opposite ends, and preferably for a short distance at the side, are provided with sheet metal casings or guards 41, said casings being preferably further heightened by the hinged hoods 42 which conform in configuration to and partially extend around the rolls 12. These hoods may be thrown down, out of the way, when it is desired to have access to the belt or the articles carried thereby.

Many modifications of minor details of my improved washing machine will doubtless readily suggest themselves to those skilled in the art to which it appertains, and I therefore do not desire to limit my invention to the specific construction herein shown and described.

I claim as new and desire to secure by Letters Patent:

1. In a washing machine, a tank, an endless belt having a portion thereof traveling in said tank, means for supporting and driving said belt, means for securing the articles to be washed to the outer face of said belt, an idler roller contacting with said outer face and deflecting said belt from the normal, and means for axially reciprocating said roller.

2. In a washing machine, a tank, an endless belt having a portion thereof traveling in said tank, means for supporting and driving said belt, means for securing the articles to be washed to the outer face of said belt, an idler roller contacting with said outer face and deflecting said belt from the normal, means for varying the vertical position of said roller, and means for axially reciprocating said roller.

3. In a washing machine, a tank, an endless belt having a portion thereof traveling in said tank, means for supporting and driving said belt, means for securing to said belt the articles to be washed, rollers contacting with opposite faces of said belt, and means for axially reciprocating the rollers contacting with that face of the belt to which the articles to be washed are applied.

4. In a washing machine, a tank, an endless belt having a portion thereof traveling in said tank, means for supporting and driving said belt, means for securing to said belt the articles to be washed, rollers contacting with opposite faces of said belt and positioned to deflect said belt from its normal path, and means for axially reciprocating the rollers contacting with that face of the belt to which the articles to be washed are secured.

5. In a washing machine, a tank, an endless belt having a portion thereof traveling in said tank, means for supporting and driving said belt, means for securing to said belt the articles to be washed, rollers contacting with opposite faces of said belt and positioned to deflect said belt from its normal path, means for varying the relative vertical positions of said rollers, and means for axially reciprocating the rollers contacting with that face of the belt to which the articles to be washed are secured.

6. In a washing machine, a tank, rolls journaled near the opposite ends of the tank, an endless belt passing over the rolls and having means for holding the articles to be washed, rollers contacting with the opposite faces of the upper length of the belt and arranged intermediate said rolls, and means for axially reciprocating the rollers contacting with that face of the belt to which the articles to be washed are applied.

7. In a washing machine, a tank, rolls journaled near opposite ends of the tank, an endless belt passing over the rolls and having means for holding the articles to be washed, rollers contacting with the opposite faces of the upper length of said belt and arranged intermediate said rollers, said rollers being positioned to deflect said belt from its normal path, and means for axially reciprocating the rollers contacting with that face of the belt to which the articles to be washed are applied.

8. In a washing machine, a tank, an endless belt in said tank to which the articles to be washed are applied, means for driving the belt, a roller in contact with that face of the belt which carries said articles, an operating lever fulcrumed intermediate its length having a connection with the roller at one end and a slotted and grooved head at its opposite end, a driving shaft passing through the slot of said head, a crank-arm fixed to the driving shaft, and a block slidable in the groove of the head and connected with the crank-arm.

9. In a washing machine, a belt for carrying the articles to be washed, means for driving the belt, a revoluble washing roller contacting with that face of the belt to which the articles are applied, and means for reciprocating the roller transversely to the movement of the belt.

10. In a washing machine, a belt, means for securing thereto the articles to be washed, means for supporting and driving said belt, a revoluble washing roller contacting with face of the belt to which said articles are secured and deflecting said belt from its normal path, means for reciprocating the roller transversely to the movement of the belt, and means for varying the vertical position of said roller.

11. In a washing machine, a belt having means for holding the articles to be washed, arranged on one face thereof, means for moving the belt rollers contacting with the opposite face of the belt, a roller contacting with the face of the belt to which the articles are applied, and arranged between the interval of the said rollers, and means for reciprocating the roller transversely to the movement of the belt.

12. In a washing machine, an endless belt having means for holding the articles to be washed, means for driving the belt, rollers between which said belt passes, transversely slidable bearings in which certain of said rollers are journaled, a driving-shaft, and an operating-lever for actuating said slidable bearings from the driving-shaft.

13. In a washing machine, a tank, rolls journaled near the opposite ends of the tank, an endless belt carried by the rolls, rollers contacting with the under face of the upper length of the belt, a corrugated roller contacting with the upper face of the belt and arranged in the interval between said rollers, transversely slidable bearings in which the corrugated roller is journaled, an operating-lever having a grooved head and connected with one of said bearings, a driving-shaft, and a crank-arm carried by the driving-shaft having a bearing-block slidable in the groove of said head.

14. In a washing machine, a tank, rolls journaled near the opposite ends of the tank, an endless belt passing over the rolls and having means for applying the articles to be washed thereto, rollers contacting with the under face of the upper length of the belt, a roll arranged in the interval between said rollers and contacting with the upper face of the belt, bearings slidably mounted, in which the said roller is journaled and longitudinally immovable with respect thereto, a link fulcrumed to a fixed point and connected to one of said bearings, an operating-lever fulcrumed at a fixed point and connected with the other bearing, a driving-shaft, and means for actuating the operating-lever from the driving-shaft.

In testimony of the foregoing I hereunto set my hand in the presence of two witnesses.

EMIL EISEMANN.

Witnesses:

WILLIAM TAFT,

GUSTAV LACHMANN.